July 15, 1952 G. P. SCHEER 2,603,050
POWER TAKE-OFF TRAIL MOWERS
Filed Oct. 9, 1946 3 Sheets-Sheet 1
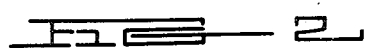
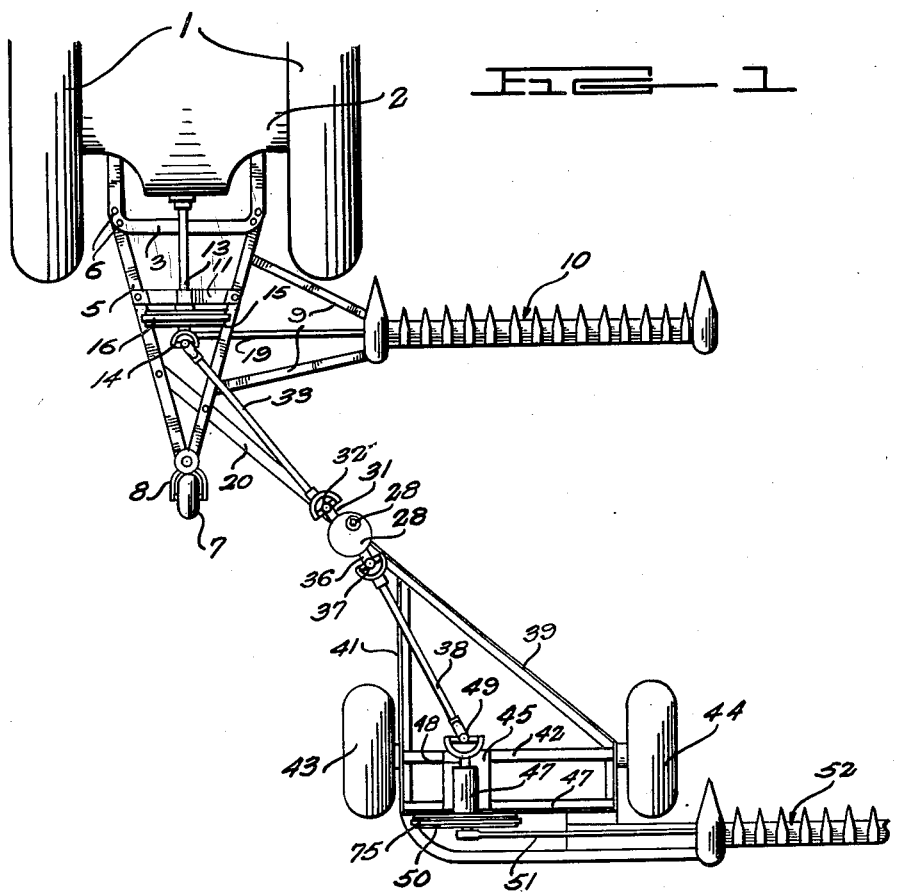
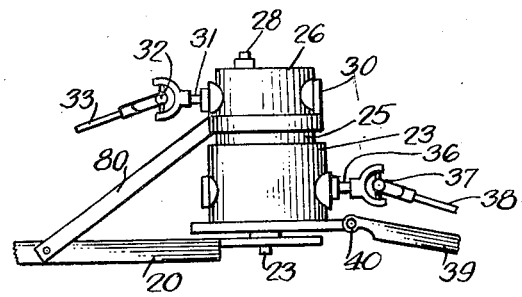
Inventor
Gerhard P. Scheer
By Clarence A. O'Brien
and Harvey B. Jacobson
Attorneys July 15, 1952      G. P. SCHEER      2,603,050
POWER TAKE-OFF TRAIL MOWERS
Filed Oct. 9, 1946      3 Sheets-Sheet 2
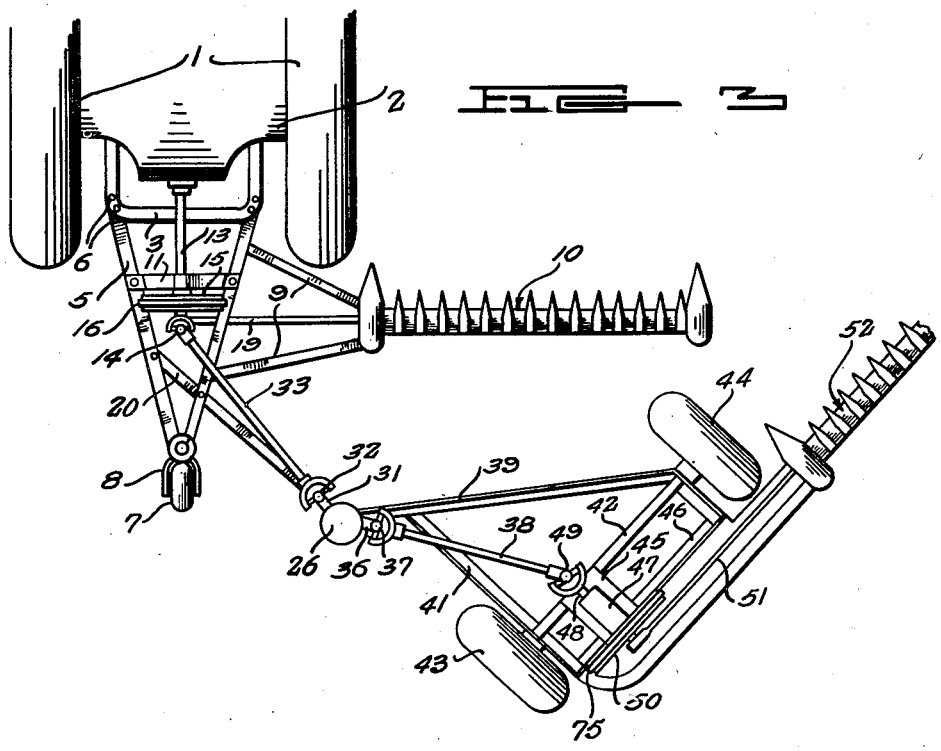
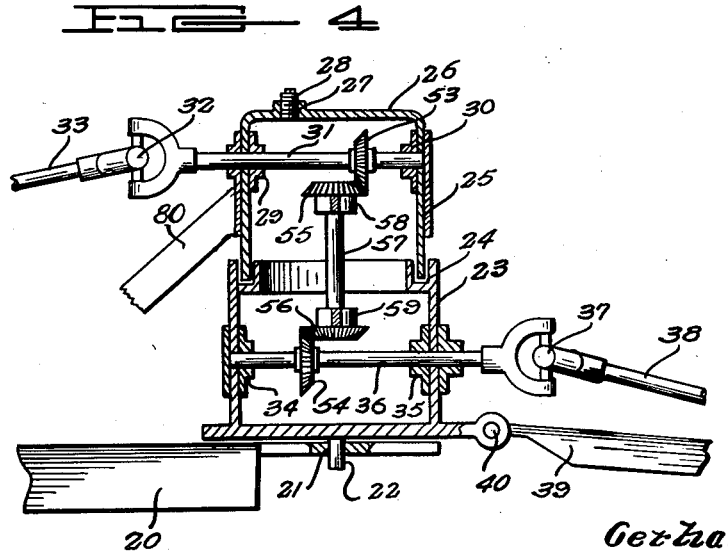
Inventor
Gerhard P. Scheer
By Clarence A. O'Brien and Harvey B. Jacobson
Attorneys July 15, 1952  G. P. SCHEER  2,603,050
POWER TAKE-OFF TRAIL MOWERS
Filed Oct. 9, 1946  3 Sheets-Sheet 3
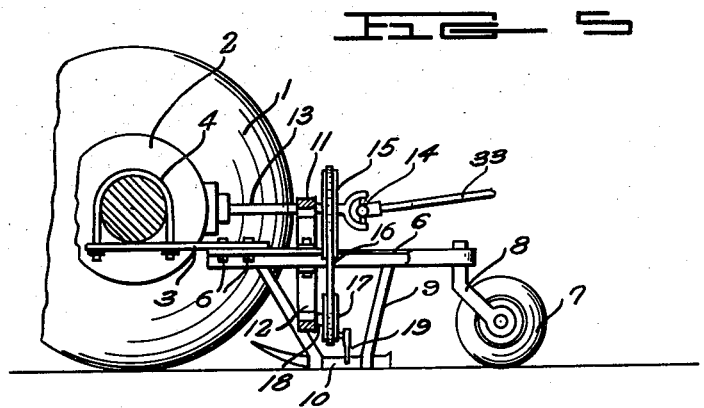
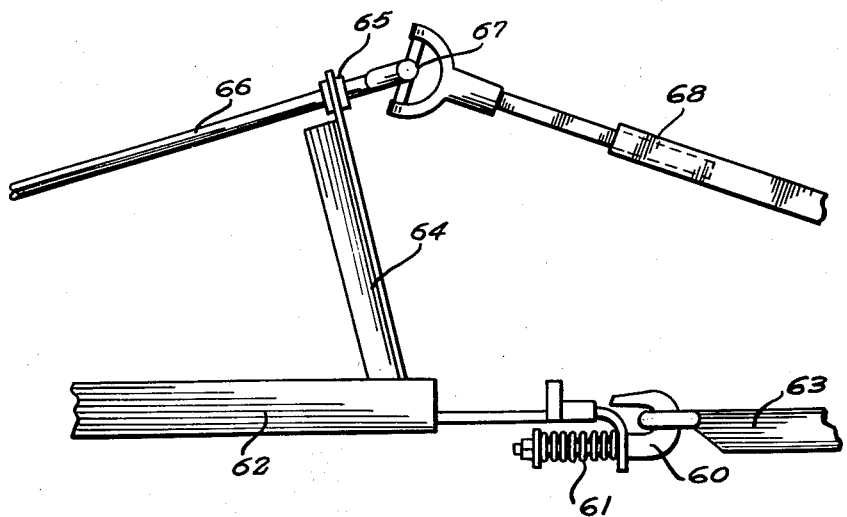
Inventor
Gerhard P. Scheer
By Clarence A. O'Brien
and Harvey B. Jacobson
Attorneys Patented July 15, 1952

2,603,050

UNITED STATES PATENT OFFICE 2,603,050

POWER TAKE-OFF FOR TRAIL MOWERS

Gerhard P. Scheer, Wood Lake, Nebr.

Application October 9, 1946, Serial No. 702,260

5 Claims. (Cl. 56—6)

This invention relates to improvements in power take-off mechanisms for trail mowers.

An object of the invention is to provide an improved power take-off mechanism attachable to a tractor for operating trail mowers.

Another object of the invention is to provide an improved power take-off mechanism for attaching trail mowers to a tractor for efficiently operating the same, and more especially for making sharp turns and permitting the operation of the tractor and trail mowers in restricted places.

A further object of the invention is to provide an improved form of power take-off for trail mowers whereby the sickle bars of said mowers will be independently operated through connections with the power take-off on a tractor, together with means whereby the rear mower may pivot and turn about a fixed point to the rear of the inner end of said fixed mower.

A still further object of the invention is to provide an improved power take-off for trail mowers which will be highly efficient in operation, and relatively inexpensive to manufacture and produce.

Other objects will appear as the description proceeds.

In the accompanying drawings which form a part of this application,

Figure 1 is a plan view of the improved power take-off mechanism for trail mowers showing the same attached to a tractor;

Figure 2 is an enlarged side elevation of the gear box with drive connections which is disposed between the fixed mower and the trail mower;

Figure 3 is a plan view of the improved power take-off mechanism for trail mowers showing the same attached to a tractor, and with the trail mower turned in the position to execute a turn;

Figure 4 is an enlarged vertical sectional view taken through the gear box showing the gearing and driving connections supported thereby;

Figure 5 is a side elevation of the fixed mower showing it attached to the rear axle or housing of a tractor and connected with the power take-off therefrom, and Figure 6 is a side elevation of a modified form of power take-off connection which may be used between two or more mowers.

Like characters of reference are used throughout the following specification and the accompanying drawings to designate corresponding parts.

The attachment forming the subject of this invention is adapted for use with a tractor, the rear portion of which is illustrated in Figure 3, and which tractor, as is conventional, has rear wheels 1 and an axle housing 2 connected therebetween.

A U-shaped attaching yoke 3 is secured by means of the U-bolts 4 about the axle housing 2 of the tractor, and supports the forward ends of the V-shaped frame 5 which is secured thereto by the bolts 6.

A ground engaging guide or tracking wheel 7 is mounted in the fork 8 for rotary movement at the rear or apex of the frame 5, which in turn supports the laterally extending arms 9 whose outer ends support the fixed cutter bar type mower generally designated by the reference numeral 10.

Aligned bearing brackets 11 and 12 are disposed on top of and beneath the frame 5, said bracket 11 supporting the drive shaft 13 of the tractor power take-off which supports the universal coupling 14 at its rear end, and a large pulley 15 between the bracket 11 and coupling 14. A belt 16 is connected between the pulley 15 and a smaller pulley 17 on the stub shaft 18 supported by the bracket 12. The pitman rod 19 is secured at its end to the pulley 17 and at its outer end with the cutter bar of the mower 10 for operating the same.

A draw bar 20 is secured at its forward end to the frame 5 and extends rearwardly at an angle thereto. The rear end of said draw bar 20 is apertured at 21 to receive and support the depending positioning pin or lug 22 for rotation, the same being formed on the bottom of the lower portion 23 of the gear box. A U-shaped bearing channel 24 is formed about the upper periphery of the portion 23 of the gear box and supports the lower end of the cylindrical upper portion 25 of the gear box, the same being closed at its top as at 26 and provided with a threaded opening 27 and removable threaded closure plug 28 whereby the gear box may be filled with a proper lubricant.

Opposed bearings 29 and 30 are formed in the upper portion 25 of the gear box and support the shaft 31 which extends through one side thereof, being secured to the universal coupling 32 on the drive shaft 33, whose forward end is attached to the universal coupling 14.

Opposed bearings 34 and 35 are formed in the lower or bottom portion 23 of the gear box to support the shaft 36 which extends rearwardly through the bottom portion 23 of the gear box to connect with the universal coupling 37 on the forward end of the drive shaft 38, whose purpose will be hereinafter described.

A rear draw bar 39 will be detachably secured to the bottom portion 23 of the gear box by means of the pin 40, said bar 39 together with the frame bar 41 forming a V-shape frame between which the axle 42 is mounted for supporting the rubber tired wheels 43 and 44. A plate 45 is mounted between the axle 42 and the rear connecting frame bar 46 disposed between the rear ends of said bars 39 and 41 to support the bearing 47 through which the shaft 48 extends. A universal coupling 49 connects the adjacent ends of the shafts 38 and 48, and a pulley 50 is mounted on the rear end of the shaft 48 to receive the belt 75 being operatively connected with a small pulley (not shown) and pitman rod 51 for operating the cutter bar of the trail mower generally designated by the reference numeral 52, which is suitably attached to rear frame.

Bevel gears 53 and 54 will be secured respectively on the shafts 31 and 36 in the upper and lower portions of the gear box and will be respectively in mesh with the bevel gears 55 and 56 secured upon the upper and lower ends of the vertical shaft 57, which will be supported in the bearings 58 and 59 secured to the inner walls of said upper and lower portions of the gear box, or in any other desired manner.

A brace 80 will be disposed between the draw bar 20 and the upper portions 25 of the gear box to hold said portion in fixed position while permitting the lower portion 23 to pivot on the pin 22.

In Figure 6 of the drawings there is illustrated a modified form of connection including a clevis connector 60 having a spring 61 about the shank thereof for attaching the draw bars 62 and 63 of forward and trailing mowers (not shown). An upstanding bracket 64 will be provided and will support the bearing 65 through which the power take-off drive shaft 66 will extend. A universal coupling 67 will be connected between the shaft 66 and the forward end of the adjustable drive shaft 68 which will operate the trail mower (not shown).

From the foregoing description, it will be apparent that there has been devised and provided a highly efficient form of power take-off mechanism for trail mowers.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a wheeled main frame having a power take-off unit, means for operatively coupling a plurality of mowers to the frame including a first frame coupled to the rear of the main frame, a mower carried thereby, a driving connection between the power take-off unit and the mower, a second frame associated with the first frame, a mower supported thereby, a pair of connecting bars rigidly secured to the first and second frames, a sectional gear box adapted for connecting disposition between the bars, means for pivotally and swively securing one of the drawbars to the gear box, gears disposed in said box, drive shafts connected between the gears and the mowers and a drive shaft connected between the power take-off unit and the drive shafts.

2. In combination with a tractor having a power take-off connection and a plurality of machines operatively drafted thereby, a front machine supporting frame rigidly coupled to the rear section of the tractor, a machine carried by said frame, a first drawbar rigidly attached to said front frame, a rear machine supporting frame and a machine carried thereby, a second drawbar rigidly secured to said rear frame, means connecting said second drawbar to said first drawbar for horizontal pivotal movement relative thereto, drive means operatively connecting each of said machines to said power take-off of said tractor, said drive means including a gear box attached to said drawbars adjacent the pivotal connection thereof.

3. The combination of claim 2, wherein said gear box includes upper and lower relatively rotatable sections, each of said sections being non-rotatably attached to one of said drawbars, gears disposed in the box, drive shafts connected between said gears and said machines, and a drive shaft connected between the power take-off and the drive shafts.

4. In combination with a tractor having a power take-off connection, a front frame rigidly coupled to the rear section of the tractor, a first drawbar rigidly attached to said front frame, a rear machine supporting frame and a machine carried thereby, a second drawbar rigidly attached to said rear frame, a hinge pin depending from said second drawbar and rotatably extending through said first drawbar to horizontally pivotally connect said rear frame to said front frame, a lower gear box attached to said second drawbar, an upper gear box horizontally rotatably mounted on said lower box axially of said pin, means non-rotatably attaching said upper gear box to said first draft bar, shafts rotatably mounted in said upper and lower boxes and extending transversely thereof, means drivingly connecting said shafts, said shaft in said upper box being operatively connected to said power take-off of said tractor, said shaft in said lower box being operatively connected to said machine.

5. The combination of claim 4, wherein said lower box has an annular upwardly opening recess therein, said upper box being rotatably received in said recess, said means for attaching said upper gear box to said first drawbar retaining said upper box in said recess.

GERHARD P. SCHEER.

REFERENCES CITED

The following references are of record in the file of this patent:

UNITED STATES PATENTS

| Number | Name | Date |
|---|---|---|
| 1,245,168 | Wright | Nov. 6, 1917 |
| 2,150,350 | Vargas | Mar. 14, 1939 |
| 2,296,518 | Greer et al. | Sept. 22, 1942 |

FOREIGN PATENTS

| Number | Country | Date |
|---|---|---|
| 504,496 | Great Britain | Apr. 26, 1939 |